US00RE34890E

United States Patent [19]

Sacre

[11] E Patent Number: Re. 34,890

[45] Reissued Date of Patent: Apr. 4, 1995

[54] WATERPROOF SHOE CONSTRUCTION

[75] Inventor: Guillaume Sacre, West Linn, Oreg.

[73] Assignee: Gore Enterprise Holdings, Inc.

[21] Appl. No.: 126,123

[22] Filed: Sep. 23, 1993

Related U.S. Patent Documents

Reissue of:

[64] Patent No.: 4,599,810
Issued: Jul. 15, 1986
Appl. No.: 553,097
Filed: Nov. 18, 1983

U.S. Applications:

[63] Continuation of Ser. No. 646,828, Jan. 25, 1991, abandoned, which is a continuation of Ser. No. 290,485, Aug. 6, 1981, abandoned.

[51] Int. Cl.[6] ..... A43B 23/07
[52] U.S. Cl. ..... 36/55; 36/83
[58] Field of Search ..... 36/55, 93, 83, 4; 2/87, 2/82, 239; 264/127

[56] References Cited

U.S. PATENT DOCUMENTS

| | | | |
|---|---|---|---|
| 2,297,656 | 9/1942 | L'Hollier | 36/55 |
| 2,619,741 | 12/1952 | Clark | 36/55 |
| 2,724,676 | 11/1955 | Randall et al. | 154/139 |
| 2,869,253 | 1/1959 | Sachs | 36/3 |
| 2,883,316 | 4/1959 | Leahy | 154/50 |
| 3,239,952 | 3/1966 | Lange et al. | 36/2.5 |
| 3,289,328 | 12/1966 | Abel . | |
| 3,350,795 | 11/1967 | Schlecht | 36/55 |
| 3,530,595 | 9/1970 | Vogel | 36/2.5 |
| 3,581,412 | 6/1971 | Dalebout | 36/93 |
| 3,627,567 | 12/1971 | Tensho | 117/76 T |
| 3,750,310 | 8/1973 | Messner et al. | 36/93 |

(List continued on next page.)

FOREIGN PATENT DOCUMENTS

| | | | |
|---|---|---|---|
| 80710 | 11/1982 | European Pat. Off. . | |
| 690392 | 9/1930 | France | 36/5[illegible] |
| 1228239 | 8/1960 | France . | |
| 2116790 | 7/1972 | France . | |
| 787148 | 11/1951 | Germany . | |
| 20586 | 1/1961 | Germany . | |
| 1096324 | 1/1961 | Germany . | |
| 1850326 | 12/1961 | Germany . | |
| 1924306 | 12/1961 | Germany . | |

(List continued on next page.)

OTHER PUBLICATIONS

Gore Hot Air Machine Manual, 1980.
"Gore-Tex Waterproof Breathable Laminates", Journal of Coated Fabrics, vol. 6 (Jul. 1976).

(List continued on next page.)

*Primary Examiner*—Steven N. Meyers
*Attorney, Agent, or Firm*—Morgan & Finnegan

[57] ABSTRACT

An inner liner is provided for a shoe that makes the shoe waterproof and at the same time allows the foot to breathe. To accomplish this purpose, such a liner is constructed of a material that is impervious to water but is pervious to perspiration vapors. The liner comprises a sock-like configuration shaped to fit within a shoe upper and attached to the top and bottom portions of the upper, such liner having fold portions similar to fold portions at the front of the shoe to allow expansion and contraction thereof when the shoe is placed on the foot and removed. The liner may also employ a novel seam in joined portions thereof, and its particular structure allows it to be combined with all conventional types of shoe constructions.

9 Claims, 2 Drawing Sheets

U.S. PATENT DOCUMENTS

| | | | |
|---|---|---|---|
| 3,866,245 | 2/1975 | Sutherland | 2/169 |
| 3,953,566 | 4/1976 | Gore | 264/288 |
| 4,110,392 | 8/1978 | Yamazaki | 264/127 |
| 4,194,041 | 3/1980 | Gore et al. | 428/315 |
| 4,194,308 | 3/1980 | Karlsson | 36/9 R |
| 4,242,769 | 1/1981 | Rayfield | 2/82 |
| 4,292,746 | 10/1981 | Delaney | 36/83 |
| 4,301,564 | 11/1981 | Dalebout | 36/117 |
| 4,341,096 | 7/1982 | Safrit et al. | 2/239 |
| 4,443,511 | 4/1984 | Worden | 428/198 |

FOREIGN PATENT DOCUMENTS

| | | |
|---|---|---|
| 1248006 | 8/1967 | Germany . |
| 2123316 | 12/1971 | Germany . |
| 2551233 | 5/1976 | Germany . |
| 2711579 | 4/1978 | Germany . |
| 2737756 | 3/1979 | Germany . |
| 2854464 | 7/1980 | Germany . |
| 149459 | 7/1981 | Germany . |
| 158462 | 1/1983 | Germany . |
| 167792 | 11/1975 | Italy . |
| 70430 | 5/1945 | Norway . |
| 1358373 | 6/1974 | United Kingdom . |

OTHER PUBLICATIONS

Purchase Order of Early Winters, Ltd. to Danner Boot Co., Jun. 20, 1980.

Recreational Equipment, Inc. Catalogue, p. 28, Spring, 1980.

Danner Shoe Mfg. Co. Shipping Invoice, Oct. 14, 1980.

Danner Shoe Mfg. Co. Shipping Invoice, Aug. 28, 1980.

Golke and Tanner, Gore-Tex Waterproof Breathable Laminates, 6 J. Coated Fabrics 28–37 (Jul. 1976).

Harold Rose, *Fusible Interlinings—Origins and Technology;* 1–10 (Highgate Publications).

P. Sroka and K. Stukenbrock, Hanbuch der Textilen Fixiereinlagen, Sections 1.1, 1.2, 1.3 and 6 (1980) (Sinus Publishers) (with translation).

F. J. Fleissner, *Der Weg zum Chefmodelleur,* (1955) (Schuhindustrie-Verlag Seiler & Co.) (with translation).

Romika Order Book 1970/71 Fall/Winter, 1, 2, 72 (with translation).

Romika Order Book 1972/73 Fall/Winter, 1, 2, 25 (with translation).

Drawing of Nov. 30, 1989 (with translation).

Gore-Tex Fabric TM Newsletter, Fall, 1980.

Gore-Tex TM Fabric Newletter, Fall, 1981.

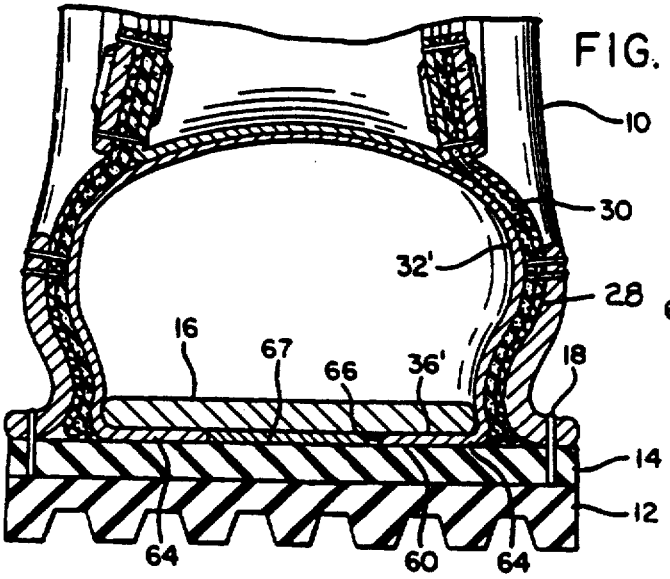
FIG. 8
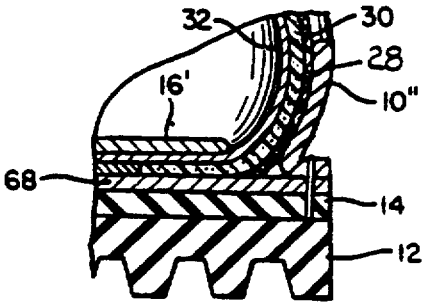
FIG. 9
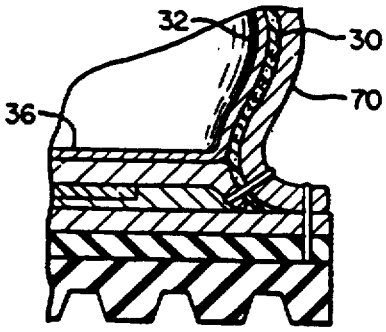
FIG. 11
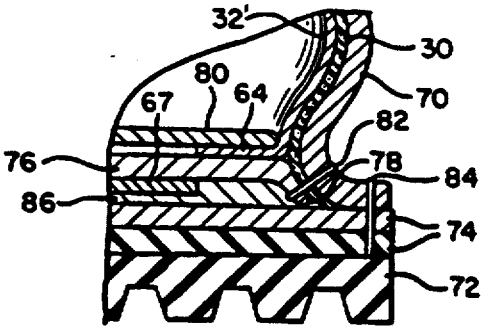
FIG. 10
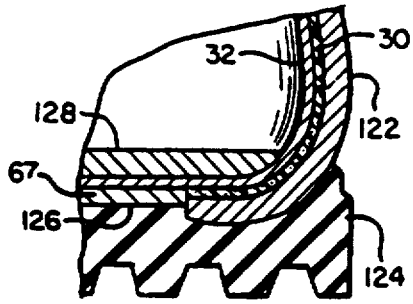
FIG. 14
FIG. 12
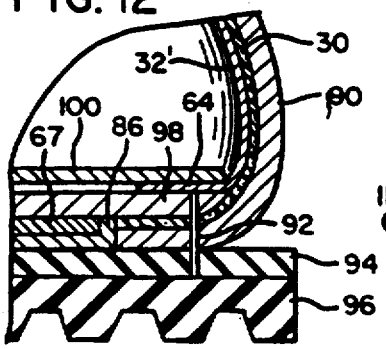
FIG. 13
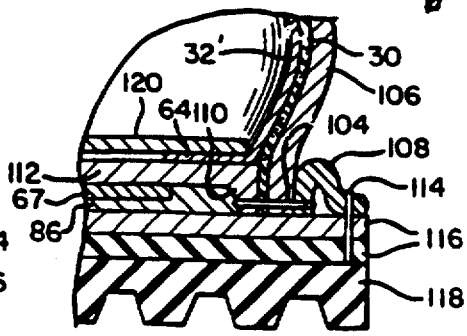

WATERPROOF SHOE CONSTRUCTION

Matter enclosed in heavy brackets [ ] appears in the original patent but forms no part of this reissue specification; matter printed in italics indicates the additions made by reissue.

*This is a continuation of application Ser. No. 07/646,828, filed on Jan. 25, 1991, now abandoned,* [This application] *which* is a continuation of U.S. application Ser. No. 290,485, filed Aug. 6, 1991, now abandoned.

BACKGROUND OF THE INVENTION

This invention relates to new and useful improvements in shoe constructions and is particularly concerned with a waterproof shoe construction.

It is well known that leather shoes without special treatment allow penetration of outside moisture into the interior of the shoe and thus the feet will eventually get wet. This is because of the porous nature of leather and also because of stitching through the leather layers to accomplish the form fitting shoe construction. Leather shoes have heretofore been waterproofed by applications of oil, wax, latex or rubber or other waterproofing substances and while such waterproofing techniques close the pores of the leather, they cannot completely close the stitching holes resulting from the attachment of the sole and upper portions. Furthermore, the waterproofing treatment of the shoe does not allow the foot to breathe whereby perspiration vapors condense and moisture gathers around the foot. Other types of shoes have been provided that are completely waterproof, such as rubber or plastic shoes, but here again the feet cannot breathe and such shoes are generally uncomfortable and unhealthy in their use. Also, this latter type of shoe is not repairable.

SUMMARY OF THE INVENTION

According to the present invention and forming a primary objective thereof, a shoe construction is provided that is impervious to water but pervious to perspiration vapors whereby to provide a waterproof construction but one which allows the foot to breathe.

A more particular object of the invention is to provide a shoe construction having an inner liner with a novel construction to provide such waterproof and ventilating capabilities and also to make a waterproof shoe that is repairable.

A further object is to provide a liner of the type described which has a novel shape whereby to be secured within a shoe and to provide front expansion similar to that of the tongue portion of the shoe for insertion and removal of the foot.

Another object of the invention is to provide a shoe liner of the type described which is light in weight, comfortable to the foot, and rugged in use. The liner, due to its waterproofing characteristics allows other portions of the shoe to be constructed of lightweight material, thus reducing the over-all weight of the shoe.

A further object is to provide a shoe liner of the type described having a novel seam connection which, upon the application of heat, seals overlapping layers together in a waterproof connection. If stitching is used in such seam, the seam connection also waterproofs the area around the stitching.

Still another object of the invention is to provide a waterproof shoe liner that is adaptable for use with substantially all existing types of shoe constructions. Furthermore the liner allows the shoe to be re-soled by a repairman without damaging the waterproof liner.

In carrying out the objectives of the invention, the shoe of the invention has an inner liner, with a specific construction adapting it to fit the inner contour of the shoe. It has fold portions corresponding to the front tongue fold portions of a shoe to allow expansion and contraction for inserting and removing the shoe on the foot and for lacing it in place. The liner is made from a material which is impervious to water but which is pervious to perspiration vapors. It is sock-like in its shape and may include either a complete enclosure with a full bottom wall or it may include only a partial bottom wall with waterproof sealing engagement on the sole. Seams on the liner are waterproofed by heat treating the material of the liner and/or an adhesively backed tape, or by other methods such as electro die heat sealing.

The invention will be better understood and additional objects and advantages will become apparent from the following description taken in connection with the accompanying drawings.

BRIEF DESCRIPTION OF THE DRAWINGS

FIG. 8 is an enlarged sectional view similar to FIG. 3 but showing a modified form of the liner of FIG. 2;

FIG. 9 is a fragmentary sectional view of a modified shoe construction utilizing the present invention; and FIGS. 10, 11, 12, 13 and 14 are fragmentary sectional views taken similar to FIG. 9 and showing application of the present invention to various types of conventional shoe constructions.

DETAILED DESCRIPTION OF PREFERRED EMBODIMENTS

Figure 1:
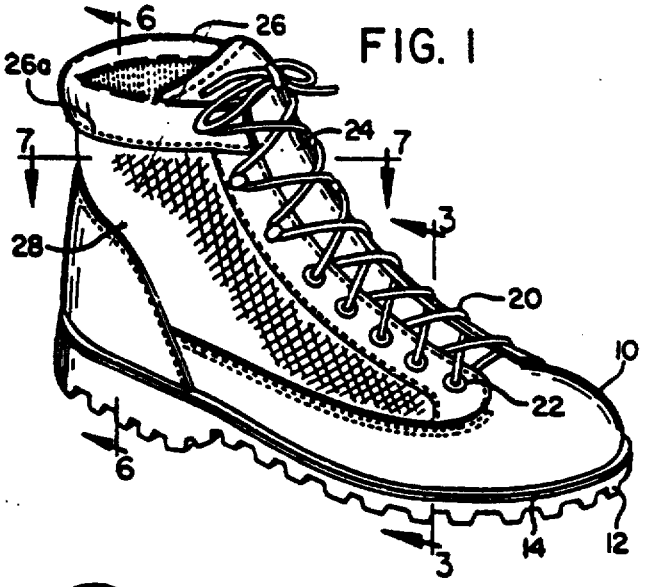
FIG. 1 is a perspective view of a shoe construction of the type with which the present invention may be combined.

With particular reference to the drawings, and first to FIGS. 1, 3, 6 and 7, the present invention is designed for use with shoe constructions having a foot receiving portion 10, referred to as the upper, an outsole 12, a midsole 14, and an insole 16. Although shoe constructions may vary, the midsole 14 is shown herein as adhesively secured to the outsole 12, and the upper 10 is secured to the midsole 14 by an outside stitchdown 18. The shoe of FIG. 1 has conventional front lacing 20 engageable in eyelets 22. The shoe also has a tongue portion 24 secured at the sides to the shoe and provided with fold portions 24a which allow for expansion and contraction of the shoe upper for insertion and removal of the foot and for lacing the shoe on the foot. A top connecting strip piece or cap 26 is doubled over the top of the upper and secured in place by stitching 26a. The shoe may have side cutout portions covered with a lightweight flexible material 28 such as fabric, thin leather, etc. secured to main leather portions of the shoe and provided for the purpose of reducing the weight of the shoe. The shoe may also have suitable conventional lining and padding 30.

Figure 2:
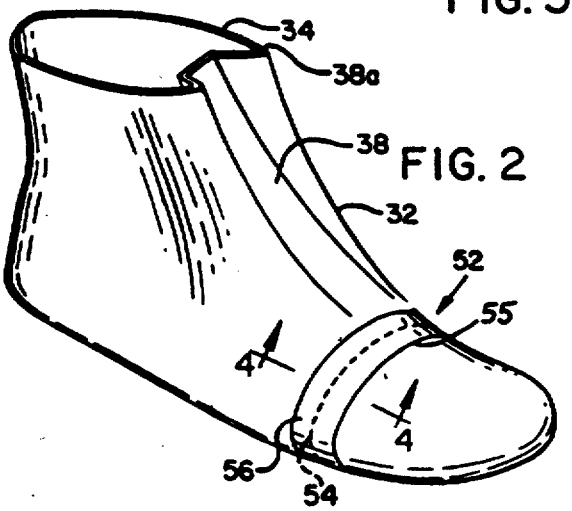
FIG. 2 is a perspective view of a liner of the instant invention shown apart from the shoe.

The waterproofing structure of the invention is designed to be combined with the shoe just described or various other types of shoe to be described hereinafter, and serves not only to provide water protection for the foot but also to allow the foot to breathe. Such invention comprises a sock-like liner 32. FIG. 2, having an open top 34 and in the embodiment of FIG. 2 having a full bottom wall 36 forming a complete enclosure except for the top. The liner is made to conform to the shape and size of the interior of the shoe and includes a front tongue portion 38 having fold portions 38e. The fold portions 38a of the liner conform in shape to the fold portions 26a of the shoe and thus all of such fold portions expand and contract together for insertion and removal of the foot.

Figure 6:
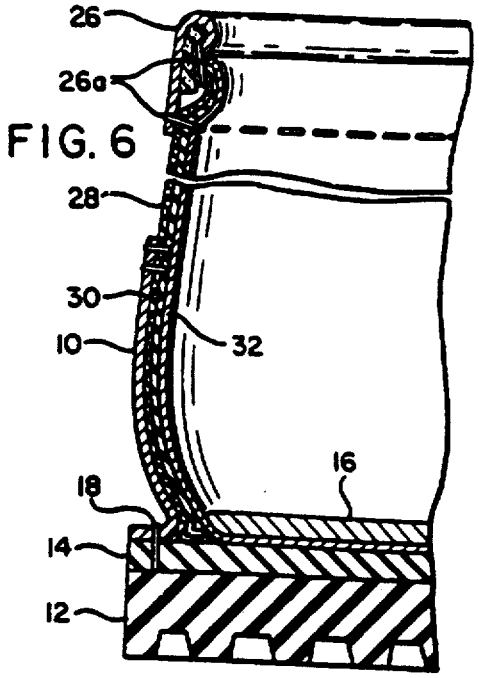
FIG. 6 is an enlarged fragmentary sectional view taken on the line 6—6 of FIG. 1.
Figure 3:
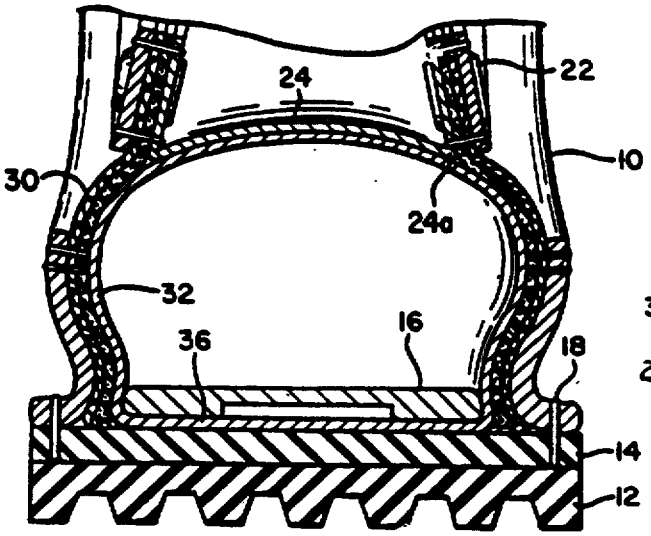
FIG. 3 is an enlarged fragmentary sectional view taken on the line 3—3 of FIG. 1 and showing the liner in the shoe.
Figure 7:
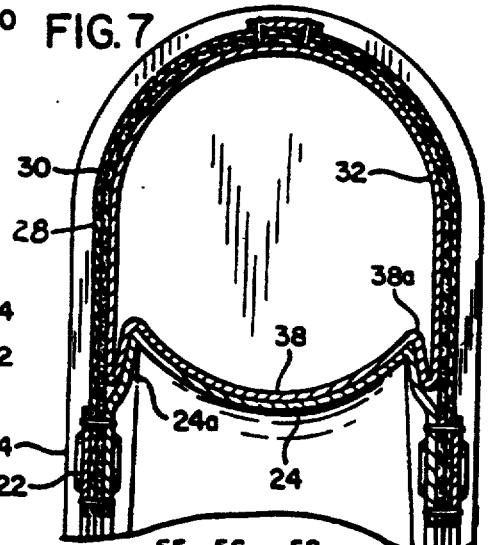
FIG. 7 is an enlarged sectional view taken on the line 7—7 of FIG. 1.

With the liner 32 mounted in the shoe, FIGS. 3, 6 and 7, the bottom wall 36 thereof seats on the midsole 14 and is adhesively secured thereto. The thickness of the shoe layers, particularly the liner 32, in the section views of FIGS. 3, 6 and 7, is exaggerated for illustration purposes. The insole 16 is supported on the bottom wall 36 of the liner 32 and is adhesively secured thereto. The upper end 34 of the liner, as best seen in FIG. 6, is secured to the top trim piece 26 by the stitching 26a. The only points of attachment of the liner to the shoe comprise its stitched connection to the top trim piece 26, which is above desired waterproofing portions of the shoe, and to the midsole 14 which comprises an adhesive, non-stitched connection. It is to be understood that the liner 32 need not be stitched at the top to the upper as shown but could as well be adhesively secured in place or suspended in the shoe by other means.

Figure 4:
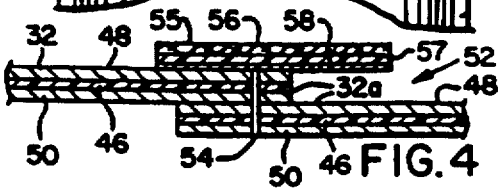
FIGS. 4 and 5 are enlarged fragmentary sectional views showing the formation of a seam in the liner of FIG. 2, such views being taken on the line 4—4 of FIG. 2 and comprising respectively an initial lay-up of the seam in its construction and the finished seam.
Figure 5:
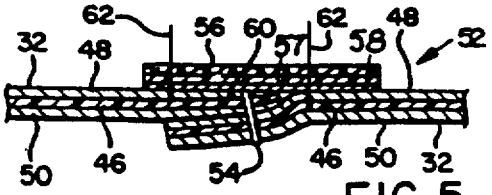

The liner 32 in its over-all construction provides the waterproofing of the shoe and is shown in enlarged section in FIGS. 4 and 5. It comprises a novel combination of layers and their construction, comprising an inner or first layer of material 46 and exterior layers 48 and 50 all secured together in laminated form by a waterproof thermoplastic resin adhesive. Layer 46 is constructed of a material which is impervious to water but pervious to perspiration vapors. This layer thus provides the waterproofing but at the same time allows the foot to breathe. A representative product having the features described for such material is a product identified on the market by the trademark GORE-TEX manufactured by W. L. Gore and Associates, Inc. This product comprises a very thin sheeting of thermoplastic resin substance that in its manufacture has the characteristic that is porous to the extent that it is impervious to water but pervious to vapors such as perspiration vapors. It has a melting point of 400° C.

*The very thin sheeting of thermoplastic resin substance of the product identified by the trademark GORE-TEX is a microporous polymeric film of polytetrafluoroethylene (PTFE). Gohlke and Tanner, GORE-TEX® Waterproof Breathable Laminates, J. Coated Fabrics, Vol. 6, 28 (July 1976).* Layers 48 and 50 comprise protective layers of abrasion resistant, rugged and porous material. Also, the material from which these exterior layers is constructed, at least the outer layer 48, namely, the layer which is next to the shoe upper 10, is also a thermoplastic resin substance. Layers 48 and 50 may thus simply comprise a woven or other porous type plastic structure having the above characteristics. The inside layer 50 must also, of course, have a surface texture which does not cause foot discomfort. A representative product for the layer 48 is a product identified on the market as Nexis manufactured by Burlington Corporation. It has a melting point of 225° C. The layer 50 is a product identified on the market as Cambrella, manufactured by Faxtex Corporation. It has a melting point of 250° C. This particular combination of materials or equivalent materials provide a liner of the desired characteristics and furthermore are adaptable to the formation of seams which in a best mode of manufacture may be required, as will now be detailed.

Such a seam is designated by the numeral 52 in FIG. 2 and has a particular structure that provides a strong and waterproof connection. The construction of the seam 52 is illustrated in detail in FIGS. 4 and 5. As noted above, the thickness of the layers 46, 48 and 50 in these views, as well as other layers to be described, are greatly exaggerated for purposes of clarity. The actual thickness of the liner wall will for example be around one thirty-seconds of an inch thick or less and not materially thicker at the seam 52.

With reference first to FIG. 4, which shows the initial lay-up of the seam in its construction, end portions 32a of the liner which are to be secured together are laid in overlapping relation and stitched together by stitching 54. The seam is covered with tape 55 having a main body portion 56 of tough high tensile strength material such as Nylon and having a melting point of at least 250° C. A layer 57 of material which is impervious to water but pervious to perspiration is laminated to main body portion 56 by a suitable thermoplastic resin adhesive. Layer 57 may comprises Gore-Tex similar to layer 46 in the liner 32, it being desired that it have a higher melting point than layer 48. The layer 57 has an adhesive coating 58 on its exposed surface, such adhesive comprising a thermoplastic resin adhesive. It is desired that this adhesive coating as well as the adhesive used in the lamination of the layers 46, 48 and 50 and layers 56 and 57 comprise a thermoplastic resin adhesive have a melting point of 225° C. or slightly less.

With the tape laid over the overlapped portions 32a of the liner, heat and pressure are then applied to the seam with the heat being applied on the tape side. The heat applied is preselected whereby to soften the layers 48 as well as the adhesive between the layers 46, 48 and 50 and the tape adhesive 58 but not to soften layers 46, 50, 56 and 57. Thus, a temperature in the range above 225° C. but below 250° C. is used. A representative pressure is 120 psi. By such process, a solid structural waterproof weld 60, FIG. 5, is provided into and including at least a portion of the depth into waterproof layers 46, namely, a penetrating distance shown by arrows 62 in FIG. 5. More particularly, the tape 55, particularly its Gore-Tex layer 57, is welded to both layers 48, and the layers 48 are welded to their respective waterproofing layers 46. By such structure, the stitching 54 is completely covered by waterproofing material and the end edges of the outside end portions 32a are sealed. In a broad sense selected materials for the layers of the liner as well as adhesive layers are used with selected heat and pressure values related to the melting point of such materials whereby such layers and adhesive form a weld from the layer 57 in the tape down to and including layers 46 on both overlapping ends 32a.

It is to be understood that the seams 52 may be formed without stitching 54 if desired such as by electro-die sealing and adhesives. It is also to be understood that other or differently placed seams may be required in the liner such as seams up the back and/or front.

With reference to FIG. 8, a somewhat modified form of liner 32' is provided. The shoe structure 10 is identical to that shown in FIGS. 1, 3, 6 and 7 but the liner 32' of the invention is modified to the extend that the bottom wall 36' does not extend the full width and length of the liner but instead has inturned flange portions 64 at the sides and around the front and rear. The bottom wall of this embodiment thus has an opening 66. In this embodiment, the flange portions 64 are permanently attached as by adhesive to the midsole 14 and to an insole 16. The numeral 67 designates a shank of conventional use and construction. These shanks may be located in the shoe as required.

FIG. 9 illustrates an embodiment 10'' of shoe construction also utilizing the present principle. Such structure uses the waterproof liner of the invention which may comprise the full bottom liner structure 32 as in FIG. 2, as shown, or it could as well comprise the open bottom liner 32' as in FIG. 8. In this embodiment, a lining 30 is disposed between the present liner 32 and the upper 10'' and is turned inwardly a short distance across the sole. Lining 30 may also be turned outwardly as in FIG. 3, if desired. Also in the embodiment of FIG. 9, an additional midsole 68 may be provided under the lining 30 and insert 32.

Another feature of the present invention is that the insert structure can be combined with various other types of shoe structures in common use. One such structure is shown in FIG. 10 and is known in the trade as the Norwegian welt. Such structure employs an upper 70 and outsole 72, one or more midsoles 74, a lower insole 76 having an outer downturned lip 78, and an insole 80. In this structure, the upper 70 is stitched to the lip 78 of the insole 76 by stitching 82, and also has an outside stitchdown 84. A liner 32' with the open bottom is readily applicable to this conventional structure by fitting it within the shoe and securing it as in FIG. 8. A filler 86 may be used under the insole 76 if desired.

FIG. 11 also shows a Norwegian welt construction and is identical to FIG. 10 except that such construction is used in combination with the insert 32 of the invention having the full bottom wall 36. Such full bottom liner can be used with an upper insole.

FIG. 12 shows a liner 32' of the invention combined with another conventional shoe construction which is known in the trade as the Little Way construction. The upper 90 of this shoe is turned in at the bottom and secured by an inside stitchdown 92 to a midsole 94 secured to an outsole 96. The liner 32' is supported on and secured to a lower insole 98 secured in place by the stitching 92. Liner 32 supports an upper insole 100.

FIG. 13 shows a liner 32' of the invention in combination with yet another conventional structure known in the trade as the Goodyear welt. In such structure, a horizontal stitching 104 secures the upper 106 to a strip 108 of welting and to a downturned lip 110 on a lower insole 112. The welting strip 108 is also secured by an outside stitchdown 114 to a midsole 116 in turn secured to outsole 118. Liner 32' seats on lower insole 112 and supports an upper insole 120.

FIG. 14 shows an injected molded welt wherein the upper 122 of leather is injection molded to the outsole 124 to provide a waterproof connection. The liner 32' of the invention is supported on the bottom of the shoe. Outsole 124 is suitably contoured at 126 for the intended purpose. An insole 128 is supported on the liner 32.

It will be seen by the above description that the present shoe liner has the distinct advantage of being capable of being combined with most conventional type shoe constructions and furthermore is readily applied to the shoe in its construction and readily replaceable if necessary. In addition to providing water protection from the outside but allowing vapor escape from the inside, the structure with the woven layers 48 and 50 is comfortable to the feet. Such liner furthermore is inexpensive to manufacture and thus does not add materially to the cost of the shoe. In addition the liner is light in weight and allows, such as by lightweight panels 28, the over-all weight of the shoe to be reduced. The shoe soles in these repairable type constructions are repairable without damaging the liner from the outside.

It is to be understood that the forms of my invention herein shown and described are to be taken as preferred examples of the same and that various changes in the shape, size and arrangement of parts may be resorted to without departing from the spirit of my invention, or the scope of the subjoined claims. For example, the liner may be installed in the shoe during the construction of the shoe or else it can be installed after the shoe is completed. In this latter instance, the liner is installed in a completed shoe by suitable attachment at the top connecting strip and by adhesively securing it to the sole, as by a heating process.

Having thus described my invention, I claim:

1. A shoe construction comprising:

(a) a sole;

(b) an integral upper having a bottom portion secured to said sole, panel portions extending upwardly from said bottom portion, a tongue and gussets connecting said tongue to said panel portions, said upper including a top opening arranged to receive a foot and defined by the edges remote from said sole of said panel portions, tongue and gussets; and (c) a *separate* sock-like liner *being a laminate of at least three layers, the outer layer thereof formed of porous, abrasion-resistant material, an intermediate layer being formed of sheeting of an effectively continuous layer of thermoplastic resin material which is impervious to water but pervious to perspiration vapor and an inner layer formed of porous, abrasion-resistant material* disposed *as an insert* in said upper, said liner [being formed of material which is impervious of water, but pervious to perspiration vapor] *forming a complete enclosure except for an open top thereof* and *said sock liner having a front tongue and gussets portion to conform with said tongue and gussets, said liner* being secured to said upper only proximate the top opening thereof *and thereby rendering the shoe waterproof to its wearer to the top opening.*

2. The shoe construction of claim 1 wherein said liner includes toe, heel, side [tongue, gusset] and bottom portions [and is open at the top], the bottom portion of said liner being adhesively fixed to said sole.

[3. The shoe construction of claim 2 wherein said bottom portion has a longitudinal opening and is adhesively fixed to adjacent sides of said sole.]

[4. The shoe construction of claim 2 wherein said bottom portion is fully closed.]

[5. The shoe construction of claim 1 wherein said liner comprises a first layer of material which is impervious to water but pervious to perspiration vapors, and a second layer of porous protective material affixed to at least one side of said first layer.]

6. The shoe construction of claim [5] *1* wherein said [second] *intermediate* layer is disposed on the side of said [first] *outer* layer adjacent said upper [and is formed of a thermoplastic resin material] and wherein said liner includes a seam comprising overlapping portions thereof and stitching holding said overlapping portions together, a tape on said [second] *intermediate* layer over said stitching, and an adhesive backing on said tape of thermoplastic resin material, said seam being waterproofed at said stitching by heat melting thermoplastic portions of said liner and tape and forming a waterproof seal.

[7. The shoe construction of claim 1 wherein said liner comprises a first layer of material which is impervious to water but pervious to perspiration vapors, and a second layer of porous protective material affixed to the side of said first layer adjacent the foot.]

[8. The shoe construction of claim 1 wherein said liner comprises a laminated structure including a first layer of material which is impervious to water but pervious to perspiration vapors disposed between second and third layers of porous protective material.]

[9. A shoe construction comprising:

(a) a sole;

(b) an integral upper having a bottom portion secured to said sole, panel portions extending upwardly from said bottom portion, a tongue and gussets connecting said tongue to said panel portions, said upper including a top opening arranged to receive a foot and defined by the edges remote from said sole of said panel portions, tongue and gussets;

(c) a sock-like liner open at the top and including toe, heel, side, tongue, gusset and bottom portions, said liner being disposed in said upper and being secured to said upper only proximate the top opening thereof and to said sole; and (d) said liner comprising laminated first and second layers, said first layer being a material which is impervious to water but pervious to perspiration vapor and said second layer being a porous, protective material.]

*10. The shoe construction of claim 1 wherein said liner is secured to said upper by stitching.*

*11. The shoe construction of claim 1 wherein said thermoplastic resin comprises microporous polytetrafluoroethylene.*

*12. The shoe construction of claim 11 wherein said microporous polytetrafluoroethylene is provided as a sheeting.*

*13. The shoe construction of claim 2, wherein said thermoplastic resin comprises microporous polytetrafluoroethylene.*

*14. The shoe construction of claim 6, wherein said thermoplastic resin comprises microporous polytetrafluoroethylene.*

*15. A shoe construction comprising:*

*(a) a sole;*

*(b) an integral upper having a bottom portion secured to said sole, panel portions extending upwardly from said bottom portion, a tongue and gussets connecting said tongue to said panel portions, said upper including a top opening arranged to receive a foot and defined by the edges remote from said sole of said panel portions tongue and gussets: and*

*(c) a separate sock-like liner being a laminate of at least three layers, the outer layer thereof formed of porous, abrasion-resistant material, an intermediate layer being formed of a sheeting of an effectively continuous layer of thermoplastic resin material of microporous polytetrafluoroethylene which is impervious to water but pervious to perspiration vapor and an inner layer formed of porous, abrasion-resistant material disposed as an insert in said upper, said liner forming a complete enclosure except for an open top thereof and said sock-like liner having a front tongue and gussets, said liner being secured by stitching to said upper proximate to the top opening thereof rendering the shoe waterproof to its wearer to the top opening, said liner further including toe, heel, side and bottom portions and in which said bottom liner portion is adhesively fixed to said sole, said liner including a seam with overlapping portions thereof and stitching holding said overlapping portions together, a tape on said intermediate layer over said stitching, and an adhesive backing on said tape of thermoplastic resin material, said seam being waterproofed at said stitching by heat melting thermoplastic portions of said liner and tape forming a waterproof seal.*

* * * * *

UNITED STATES PATENT AND TRADEMARK OFFICE

CERTIFICATE OF CORRECTION

PATENT NO. : Re. 34,890

DATED : April 4, 1995

INVENTOR(S) : Guillaume Sacre

It is certified that error appears in the above-indentified patent and that said Letters Patent is hereby corrected as shown below:

Title page:

Item [56] after "20586 1/1961 Germany" insert -- (Democratic Republic of) --;

after "149459 7/1971 Germany" insert -- (Democratic Republic of) --;

after "158462 1/1983 Germany" insert -- (Democratic Republic of) --;

Column 1, lines 9 through 12, delete ", [This Application] *which* is a continuation of U.S. Application Ser. No. 290,485 filed Aug. 6, 1981, now abandoned";

Column 3, line 13, delete "." and substitute -- , --;

Column 5, line 11, delete "extend" and substitute -- extent --;

line 50, delete "with" and substitute -- without --;

Column 6, line 58, before "the top" insert -- to --.

Signed and Sealed this

Fifteenth Day of August, 1995

*Attest:*

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : RE 34,890

DATED : April 4, 1995

INVENTOR(S) : Guillaume Sacre

It is certified that error appears in the above-indentified patent and that said Letters Patent is hereby corrected as shown below:

On the title page, item [63], after "abandoned" (first occurrence) insert which is a Reissue of Ser. No. 553,097, now Patent No. 4,599,810.

item [56] after "20586 1/1961 Germany" insert --(Democratic Republic of) --;
after "149459 7/1971 Germany" insert --(Democratic Republic of) --;
after "158462 1/1983 Germany" insert --(Democratic Republic of) --;

Column 1, line 9, after "abandoned" insert which is a Reissue of Ser. No. 553,097, now Patent No. 4,599,810.

Column 3, line 13, delete "." and substitute --,--;
Column 5, line 11, delete "extend" and substitute --extent--;
line 50, delete "with" and substitute --without--;
Column 6, line 58, before "the top" insert --to--.

This certificate supersedes Certificate of Correction issued August 15, 1995.

Signed and Sealed this

Seventh Day of November, 1995

*Attest:*

*Attesting Officer*

Bruce Lehman

BRUCE LEHMAN

*Commissioner of Patents and Trademarks*